INVENTOR.
NORMAN E. POLSTER
BY
Woodcock and Phelan
ATTORNEYS

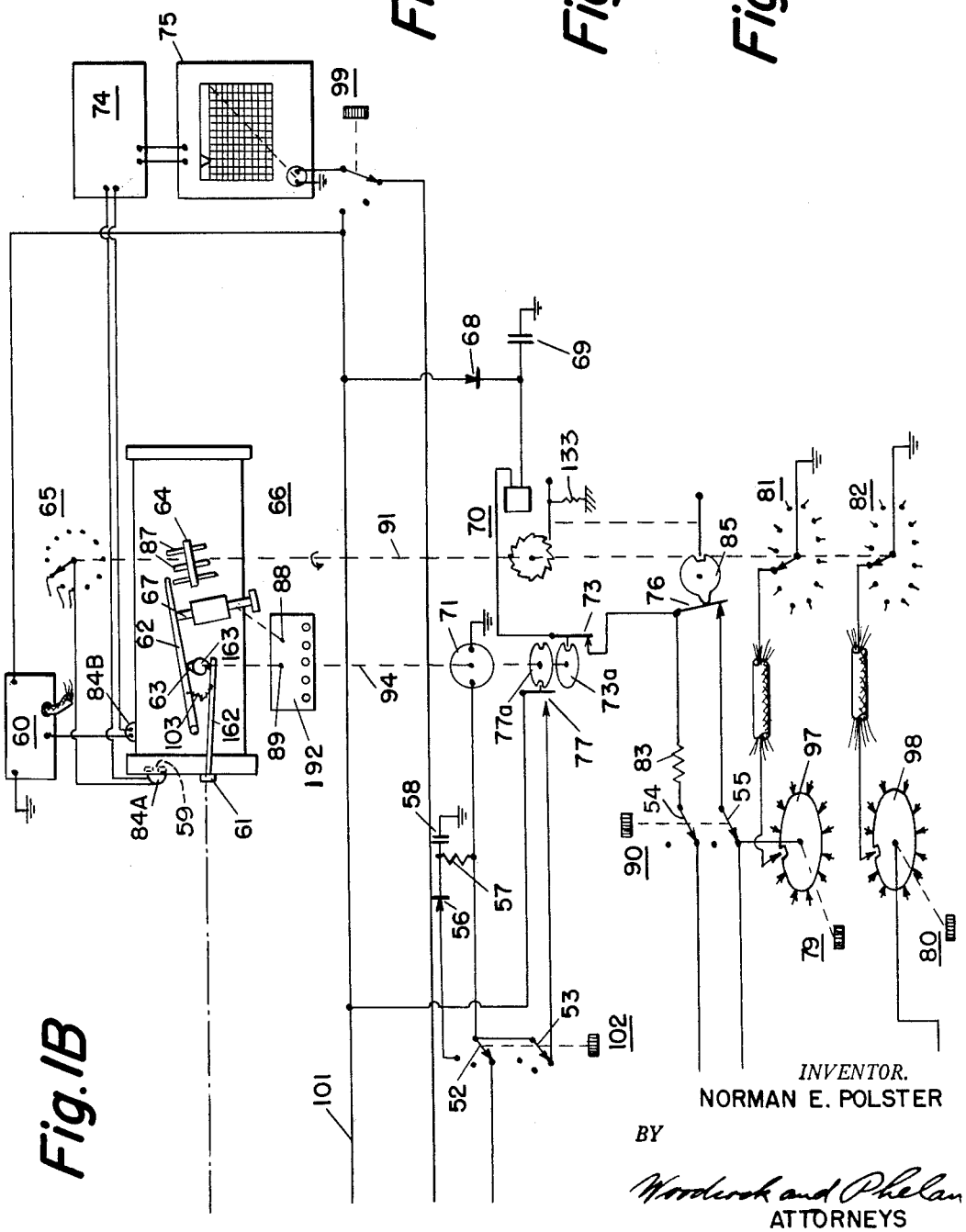

Feb. 21, 1956

N. E. POLSTER 2,735,330

SPECTROGRAPH SYSTEM WITH MOTOR CONTROLLED DISPERSING ELEMENT

Filed Aug. 10, 1951

INVENTOR.
NORMAN E. POLSTER

BY

*Woodcock and Phelan*

ATTORNEYS

Feb. 21, 1956 N. E. POLSTER 2,735,330
SPECTROGRAPH SYSTEM WITH MOTOR CONTROLLED DISPERSING ELEMENT
Filed Aug. 10, 1951 7 Sheets-Sheet 6
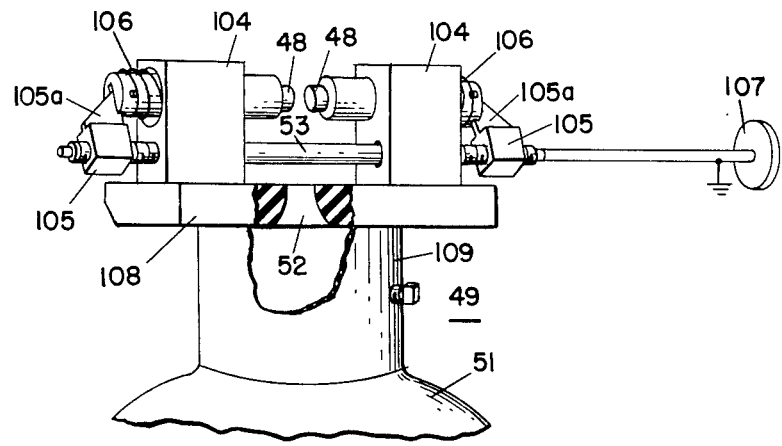
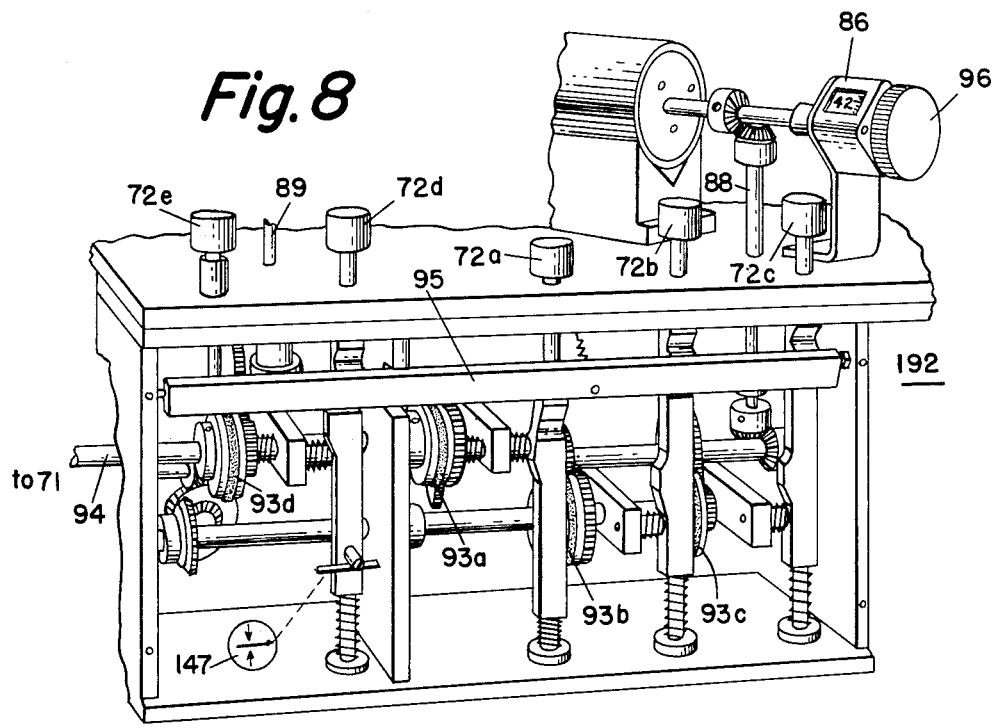
INVENTOR.
NORMAN E. POLSTER
BY
Woodcock and Phelan
ATTORNEYS United States Patent Office 2,735,330
Patented Feb. 21, 1956

2,735,330

SPECTROGRAPH SYSTEM WITH MOTOR CONTROLLED DISPERSING ELEMENT

Norman E. Polster, Huntingdon Valley, Pa., assignor to Leeds and Northrup Company, Philadelphia, Pa., a corporation of Pennsylvania Application August 10, 1951, Serial No. 241,172

16 Claims. (Cl. 88—14)

This invention relates to spectrograph systems for spectrochemical analysis, and particularly relates to electromechanical control features of the light source and monochromator of a spectrograph recorder system.

In accordance with one aspect of the invention, the monochromator is provided with a wavelength selector arm which under selective control of two actuating mechanisms may either be moved continuously for analysis of all wavelengths within a desired range or may be intermittently stepped to preselected positions for analysis of a selected spectral line or a number of selected lines in any preselected wavelength sequence.

More particularly, the motor used to effect through one driving mechanism slow movement of the wavelength arm in one direction for continuous scanning may be decoupled therefrom and connected to a second drive mechanism which at fixed intervals rocks the arm in opposite directions and controls a stepping motor successively to position in the path of the arm a series of turret stops respectively adjusted in correspondence with preselected lines to be analyzed.

Further in accordance with the invention, the control circuits of the motors include switches respectively manually set in accordance with the group of spectral lines to be scanned and each having a mating switch operated by the stepping motor, the interconnections between these switches and others operated by the motors providing for automatic setting of the monochromator to the first-line position before analysis of a preselected group of spectral lines and for automatic resetting to that position after completion of the analysis of the last spectral line in readiness for the next analysis cycle when initiated by the operator or to repeat the analysis when a recycling switch of the control system is so set.

Further in accordance with the invention, when the system is set for analysis of a selected group of spectral lines, the motor used to rock the wavelength arm to clear the next stop of the turret is also used during the measurement of each line slowly slightly to shift the narrow entrance slit of the monochromator to insure that the maximum intensity of the line is recorded.

Further and in accordance with some forms of the invention, the control circuits of the motors of the monochromator are so electrically interlocked with a relay of the light source that they effect deenergization of the light source upon completion of the analysis of the last selected spectral line.

The invention further resides in features of construction, combination and arrangement hereinafter described and claimed.

For a more detailed understanding of the invention and for illustration of exemplary embodiments thereof, reference is made to the accompanying drawings, in which:

Figs. 1A, 1B schematically illustrate a complete spectrograph system including control circuits;

Fig. 2 is a partial perspective view of the blower-control gap unit of Fig. 1A;

Figs. 3A–3D are explanatory figures referred to in discussion of the spark-rate monitor of Fig. 1A;

Fig. 8 is a perspective view showing push-button control mechanism of Figs. 1A, 6 and 7.

Figure 1A:
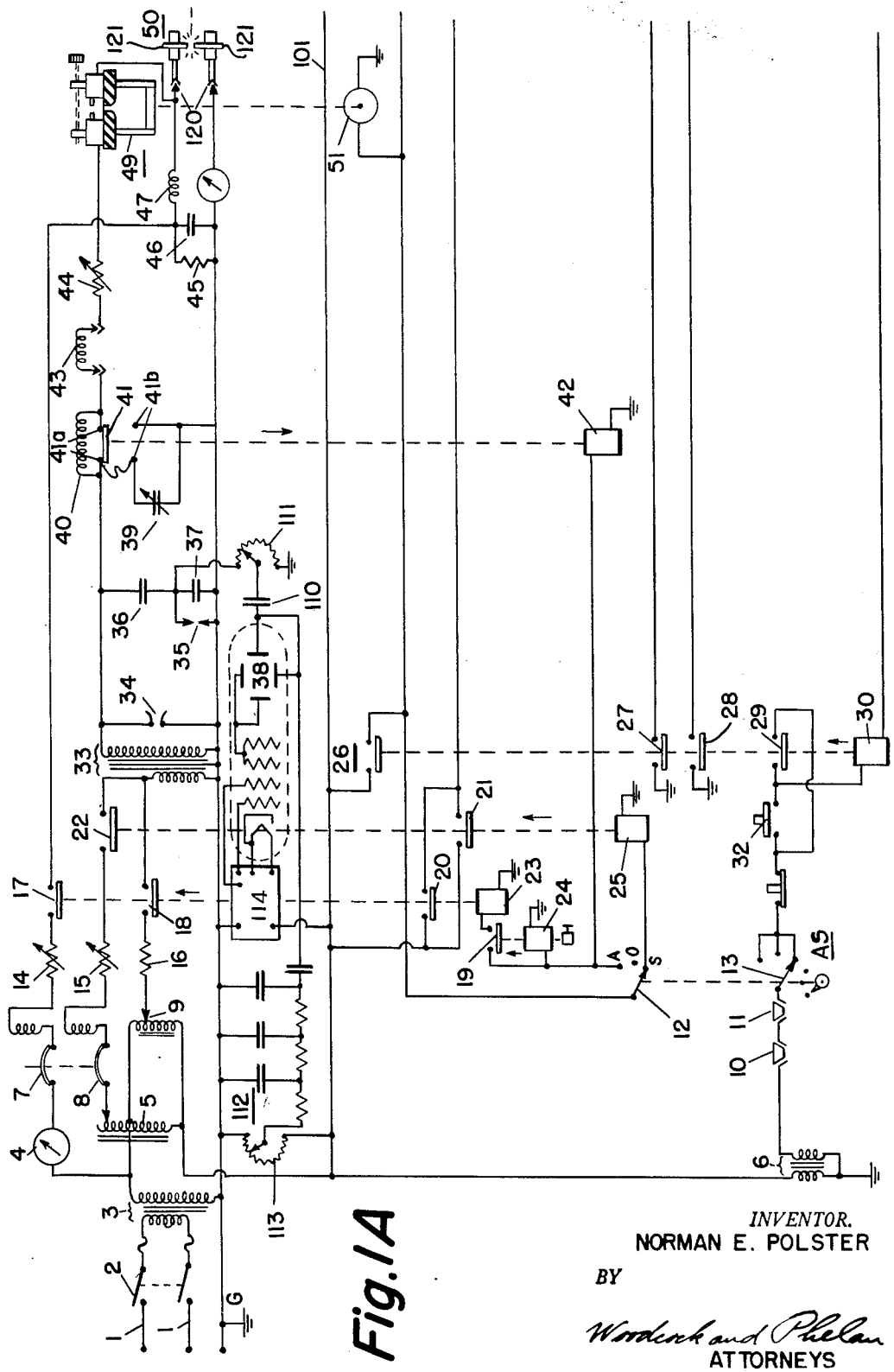

The spectrograph system shown in Figs. 1A and 1B provides for excitation of the specimen to be analyzed either by an arc or a spark-discharge at any selected one of various repetition rates for a period of time during which the associated spectrograph recorder will automatically scan any one or more preselected lines in any preselected wavelength sequence, or will record the maximum intensity of any one preselected line, or will scan through a continuous range of wavelengths at predetermined rate which, if desired, is variable by the operator.

In Fig. 1A is shown the spectrographic light source, its power supply and control circuits including interconnections with the monochromator and recorder shown in Fig. 1B. Power for all components of the complete spectrograph system is supplied from power line 1, 1 through a fused switch 2. The isolating transformer 3 provides 110 volts and 220 volts above ground G.

For a spark analysis, the contacts 12, 13 of the Arc-Spark switch AS are set to the position shown in Fig. 1A. Pressing the "Start" button 32 momentarily energizes the low-voltage relay 30 from a low-voltage transformer 6 through safety switches 10, 11 and contact 13 of the arc-spark switch which in Fig. 1A is set in "spark" position. Contacts 29 close a lock-in circuit, maintaining energization of relay 30 after the "Start" button 32 is released. Contacts 26 of relay 30 close to energize "Spark" relay 25 through contacts 12 of the Arc-Spark switch and to energize the air blower-motor 51 of the interrupter gap 49. Contacts 22 of the "Spark" relay 25 close to energize the high-voltage transformer 33 from the autotransformer 5 through circuit-breaker contact 8 and the primary spark resistor 15.

The fixed capacitor 36 and adjustable capacitor 39, in the oscillatory circuit which includes capacitors 36 and 39, inductance 43, resistor 44, control gap 49 and analytical gap 50, are charged during each half-cycle of the voltage developed across the high-voltage transformer 33. The charging rate is dependent upon the selected voltage setting of the spark autotransformer 5 and a preselected time constant determined by the product of the adjustable spark resistance 15 in the primary circuit of transformer 33 and the oscillatory circuit capacitors comprising capacitor 36 and adjustable capacitor 39. Horn gap 34 connected across the secondary winding of transformer 33 serves to protect the discharge circuit and its components from excessively high voltage surges such as voltages in excess of 25,000 volts. The analytical gap 50 comprising electrodes containing the elements being analyzed is shunted with a low pass filter 45, 46, 47 so that when breakdown of the interrupter gap 49 occurs, a voltage sufficient to break down the analytical gap 50 appears across the gap. An oscillatory discharge ensues through both gaps 49, 50 until the potential on the capacitors 36, 39 is insufficient to cause the interrupter gap to break down. The air blast from the blower of the interrupter gap 49 clears the gap space of any charged particles to make the succeeding discharges exactly the same. The capacitors 36 and 39 will repeatedly charge and discharge during each cycle until the voltage buildup is insufficient to cause the interrupter gap 49 to break down.

Thus, so long as relay 30 remains energized, the specimen electrodes of the analytical gap are periodically excited at a preselected spark voltage and at a preselected repetition rate to provide the radiation whose spectral distribution and intensity are analyzed by the spectrograph recorder. Upon completion of an analysis, the relay 30 is deenergized automatically, as later described, by control switches in the spectrograph recorder.

The control gap 49, Figs. 1A and 2, is generically similar to that disclosed and claimed in Enns Patent 2,456,116 in that its electrodes 48, 48 are disposed in a non-turbulent air stream discharged from an orifice 52. To maintain the electrodes 48, 48 centered with respect to the orifice as their spacing is varied, there is provided shaft 53 of insulating material which extends through the mounts 104 of the electrodes. The opposite ends of shaft 53, threaded in opposite directions, receive the threaded blocks 105, 105, each having an extension 105a fitting into a slot in the end of the corresponding electrode 48. The springs 106 bias the electrodes away from one another and maintain their slotted ends in engagement with block extensions 105a. Thus, as shaft 53 is rotated by knob 107, the blocks 105, 105 move in unison toward or away from one another, decreasing or increasing the electrode spacing symmetrically with respect to the vertical center line of orifice 52. Longitudinal movement of shaft 53 is prevented by stop structure (not shown).

The air-blast for maintaining the control gap free of ionized particles is provided by the blower-motor 51, Figs. 1A and 2. The air-discharge end of the blower-motor is connected to the orifice plate 108 by a hollow sleeve 109 to form a small compact and efficient unit which can be shock-mounted in a compartment of the cabinet. The air-chamber sleeve 109 is of insulating material to avoid asymmetry of the electric field in the vicinity of the control gap, a source of difficulty with prior equipment. The blower-gap unit also obviates need for an external compressed air supply requiring additional equipment such as a pressure gage, a solenoid valve, extensive piping, and a high-power motor.

For monitoring the spark-repetition rate and therefore proper functioning of the control gap 49 during an analysis, there is provided an oscilloscope 38 (Fig. 1A). To one set of deflection plates of the oscilloscope is applied, through condenser 110, a predetermined fraction of the charging voltage applied to capacitors 36, 39 and to the other set of deflection plates is applied a sinusoidal sweep voltage which is approximately 90° out of phase with the charging voltage. The signal voltage for the first set of plates is derived from capacitor 37 connected between capacitor 36 and ground, the potential-dividing resistor 111 permitting any desired fraction of the voltage across capacitor 37 to be utilized. The safety gap 35 across capacitor 37 protects it and the oscilloscope from excessively high potentials. The sweep voltage for the second set of plates of oscilloscope 38 is provided through the phase-shifting network 112 connected across an adjustable fraction of the potential-dividing resistor 113 which is connected between ground and the center-tap of secondary winding of transformer 3. The block 114 represents the power-pack for supplying the heater current and direct-current potentials for the electrodes of the oscilloscope 38.

The oscilloscope traces for zero vertical signal, signal before breakdown of gap 49, and the signals for one and three sparks per half-cycle are respectively shown in Figs. 3A–3D.

Figure 4:
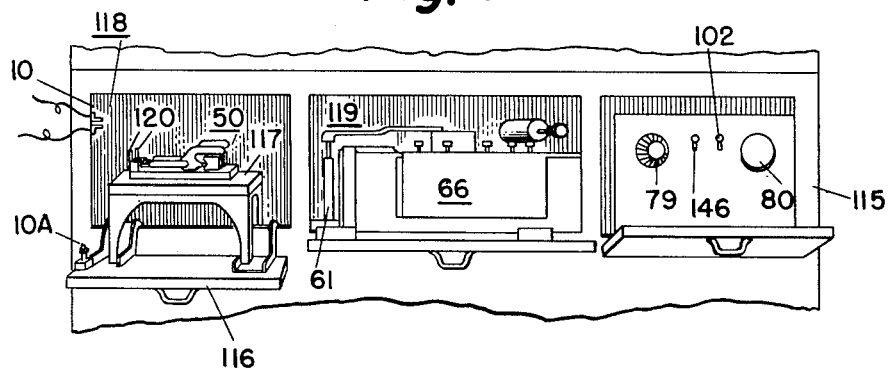
Fig. 4 shows a portion of the cabinet enclosing the system of Figs. 1A, 1B with doors opened to show the analytical gap, the monochromator and line-selector controls.

All components of the system shown in Figs. 1A, 1B may be enclosed in a cabinet 115, in part shown in Fig. 4, having doors which can be opened for access to analytical gap, the monochromator and other components to be preset or adjusted for different analyses. In general, the doors of high-voltage compartments are provided with interlock or safety switches, generically represented by switches 10, 11 of Fig. 1A, all of which must be closed before depression of "Start" button 32 can be effective to initiate operation of the system or any of its components. Specifically, when door 116, Fig. 4, is opened to put a specimen in the analytical gap, the bridging contact 10A of safety switch 10 is moved to open-circuit position. Also as shown in Fig. 4, the analytical gap assembly 117 is mounted on door 116 so that when the door is opened for insertion of specimen electrodes, the gap electrodes swing out of the compartment 118 from alignment with the entrance slit 61 of the spectrograph 66 in the adjacent compartment 119, to a position of ready accessibility. Concurrently with this movement, the plug contacts 120, 120 break connection between the electrodes of gap 50 and their energizing circuit.

Figure 5:
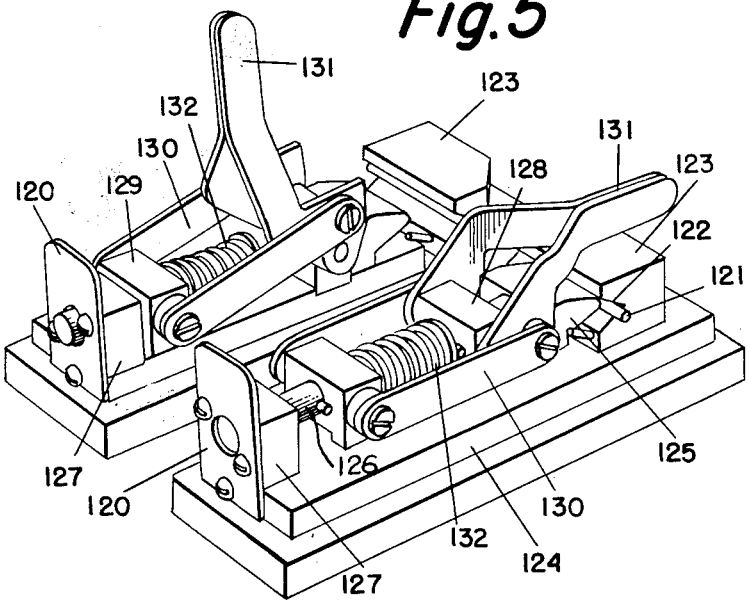
Fig. 5 is a perspective view of the elements of the analytical gap of Fig. 1A.

As most clearly shown in Fig. 5, each of the two specimen rods 121 which form the actual electrodes of the analytical gap is releasably clamped in the V-notch 122 of a metal block 123 suitably fastened to metal baseplate 124. Each electrode clamping member 125 is fastened to the forward end of a rod 126 slidably received by blocks 127, 128 fastened to baseplate 124. Rod 126 also passes through a movable block 129 connected by links 130 to the operating handle 131 pivotally mounted on block 128. The handle 131, links 130, block 129 and spring 132 form an over-center toggle which holds the clamping member 125 away from block 123 when handle 131 is in its upper position (Fig. 5) and which holds a specimen electrode 121 firmly against block 123 when handle 131 is in its lower position (Fig. 5). With the door closed, the entrance slit of the monochromator is in the plane which bisects the dihedral angles of the V notches so that regardless of their diameter, they are centered on the slit without need for any centering adjustment.

With this construction, the removal and replacement of specimen electrodes with proper centering and proper spacing between them is quickly accomplished with the analytical gap in accessible position externally of compartment 118. When the compartment door 116 is closed, the gap is swung into the compartment into proper alignment with entrance slit 61 of the monochromator and concurrently therewith contacts 120, 120 reestablish connections to the electrodes and close the associated safety switch 10. The door 116 may be horizontally hinged, as shown, or may be vertically mounted which latter has the advantages that the hot electrodes will fall outside of the compartment 118 and that powdered or liquid specimens will be retained in or on the lower electrode.

For an arc analysis, the Arc-Spark switch AS is set with its contacts 12, 13 in their uppermost or "arc" position and the "Start" button 32 is momentarily depressed to energize relay 30 whose contact 29, as previously described, completes a hold-in circuit bridging the start switch contacts.

With the contact 12 in "arc" position, closure of contacts 26 of relay 30 energizes the high-voltage relay 42 to move its contact 41 from contacts 41a and into engagement with contacts 41b so to include inductance 40 in the discharge circuit and to ground the adjustable spark capacitor 39. Grounding of capacitor 39 protects the capacitor from induced changes which might otherwise damage it. Closure of contacts 26 also completes an energizing circuit for the blower 51 and the time-delay relay 24.

After a brief delay of about one second, during which high-voltage relay contacts 41b are sure to be closed, contacts 19 of the time-delay relay 24 close to energize the arc relay 23. Contacts 18 of relay 23 close the primary spark circuit to initiate an arc between the electrodes of gap 50. The arc is maintained by current flowing from the secondary of transformer 3 through arc-current ammeter 4, circuit breaker contact 7, limiting resistor 14, contacts 17 of relay 23, filter inductance 47 and analytical gap 50. The arc current is roughly adjusted by varying the arc resistor 14 and a fine adjustment is made in the average magnitude of the arc current by varying the initiating time per cycle by adjustment of the output voltage of autotransformer 9. These adjustments are independent of those for operation as a "spark" source. The arc is initiated for each half-cycle of the power frequency and after initiation continues for the remainder of the half-cycle. The resistor 16 in the initiating spark circuit, which is distinct from the arc-current circuit, is large enough, by selection or adjustment, so that the time constant determined by resistor 16 and capacitor 36 is large enough to insure that only one initiating spark occurs during each half-cycle for a substantial range of adjustment on autotransformer 9. The large value of resistor 16 also minimizes the effect of line-voltage variations upon the time of initiation of the arc by the spark.

The filter 45, 46, 47 allows the low-frequency arc current to flow to the power-line through analytical gap 50 but blocks flow of high-frequency currents back to the power transformer 3.

The construction of the optical system of the monochromator 66 is more fully disclosed and claimed in copending applications Serial No. 241,194 and Serial No. 446,106. It suffices here to say that the optical system includes a diffraction grating 100 (Fig. 7) whose angular position is controlled by pivoted arm 62 (Figs. 1B, 6, 7) to determine which spectral line or region of the radiation passed by the entrance slit 61 shall fall upon the exit slit 59 to control the output current of phototube 84A. For ratio measurements, undispersed radiation from the light source controls the output of a second phototube 84B, as in copending applications Serial Nos. 156,763 and 241,258, and the outputs of both tubes are applied to a ratio-recording system, such as shown in Williams Patent 2,522,976, including amplifier 74 and recorder 75.

The grating arm 62 may be automatically positioned by either of two driving mechanisms, one providing continuous scanning of the spectrum and the other a step-by-step adjustment for analysis of only certain preselected spectral lines.

The continuous scanning mechanism includes a drive-screw 67 driven from motor 71 (Fig. 1B) in either selected direction and at one of several speeds selected by push buttons 72a, 72b, 72c (Figs. 1B, 6, 7, 8) of control panel 192 as later more fully described in discussion of Fig. 8. As the screw is advanced or retracted, the angular position of the grating is progressively shifted so that spectral images of the illuminated entrance slit 61 move at preselected uniform speed across the exit slit 59 of the monochromator. The Veeder counter 86 coupled to drive screw 67 indicates the wavelength of the line focused on the exit slit for each position of grating arm 62.

The arrangement providing for step-by-step adjustment of the grating arm 62 includes a drum or turret 64 having stop pins 87 which in succession are moved into the path of arm 62 for successive angular positions of drum 64. In the particular arrangement shown in Fig. 1B, there are twelve stop pins 87 angularly spaced 30° and the turret is stepped 30° for each energization of notching motor 70. In the interval just prior to a stepping movement of turret 64, the arm 62 is moved away from the stop 87 then in use by the active portion of cam 63 which is driven by motor 71, the control button 72d having been depressed prior to initiation of the analysis cycle to decouple motor 71 from the drive shaft 88 (Fig. 8) of the continuous scan screw 67 and to couple it to the drive shaft 89. The throw of the active portion of cam 63 is sufficient to insure arm 62 will not obstruct rotation of turret 64 for the limit of adjustment of stop pins 87. While arm 62 is in such clear position, the turret is stepped to bring the next stop in position for engagement by arm 62 as it is moved in reverse direction by spring 103 during continued rotation of the cam. Thus, grating 100 or equivalent light-dispersing element is positioned at a new wavelength setting corresponding with the adjustment of the last-named stop-pin 87.

The cam 163, rotating in unison with cam 63, rocks arm 162 to shift the position of the entrance slit 61 a small amount for each dwell of the grating arm against a stop 87 so to insure by this slight scanning that the maximum intensity of a line is recorded despite any slight error in positioning of the grating, such as due for example to minor errors in stop adjustment, ambient conditions or the like.

Figure 6:
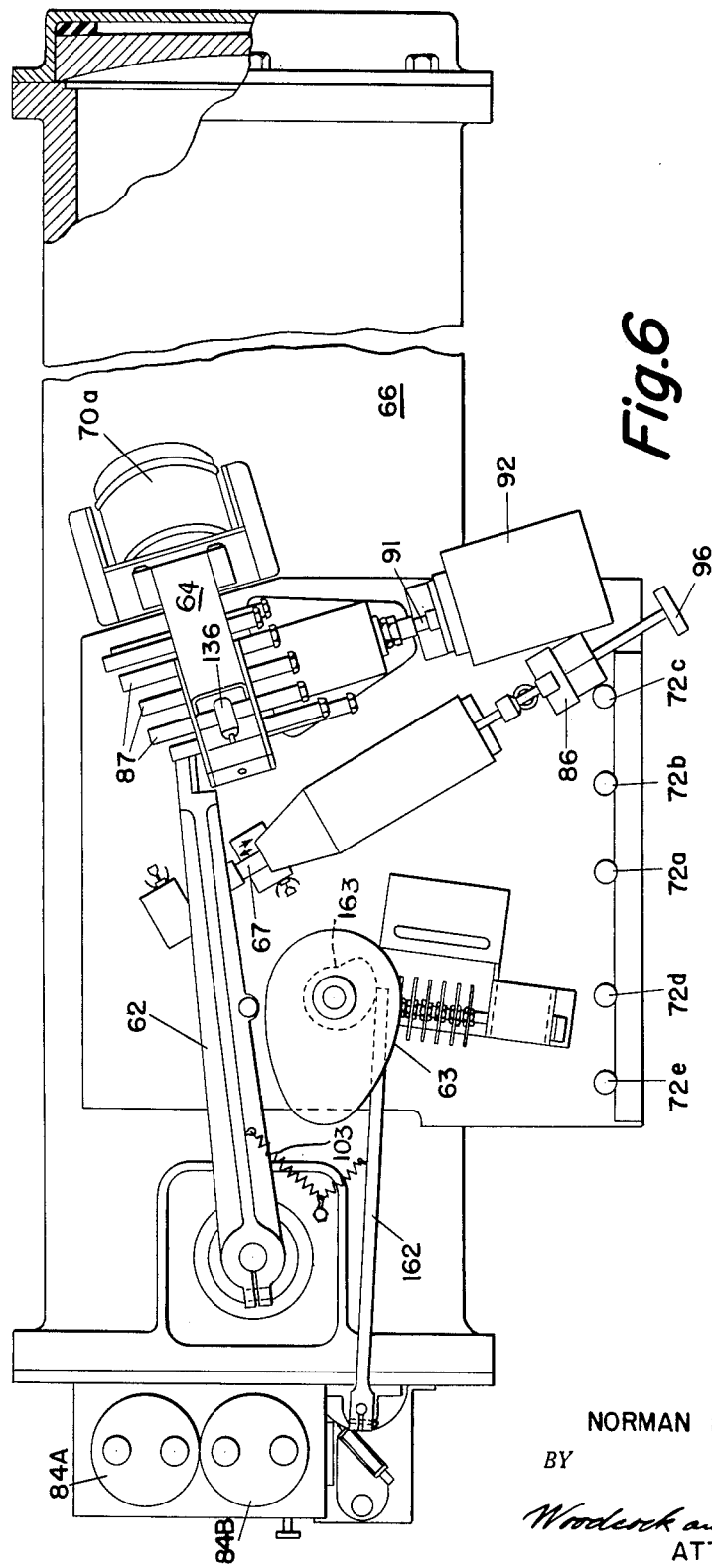
Figs. 6 and 7 are respectively top and side elevational views, partly in section, of the monochromator of Fig. 1A.
Figure 7:
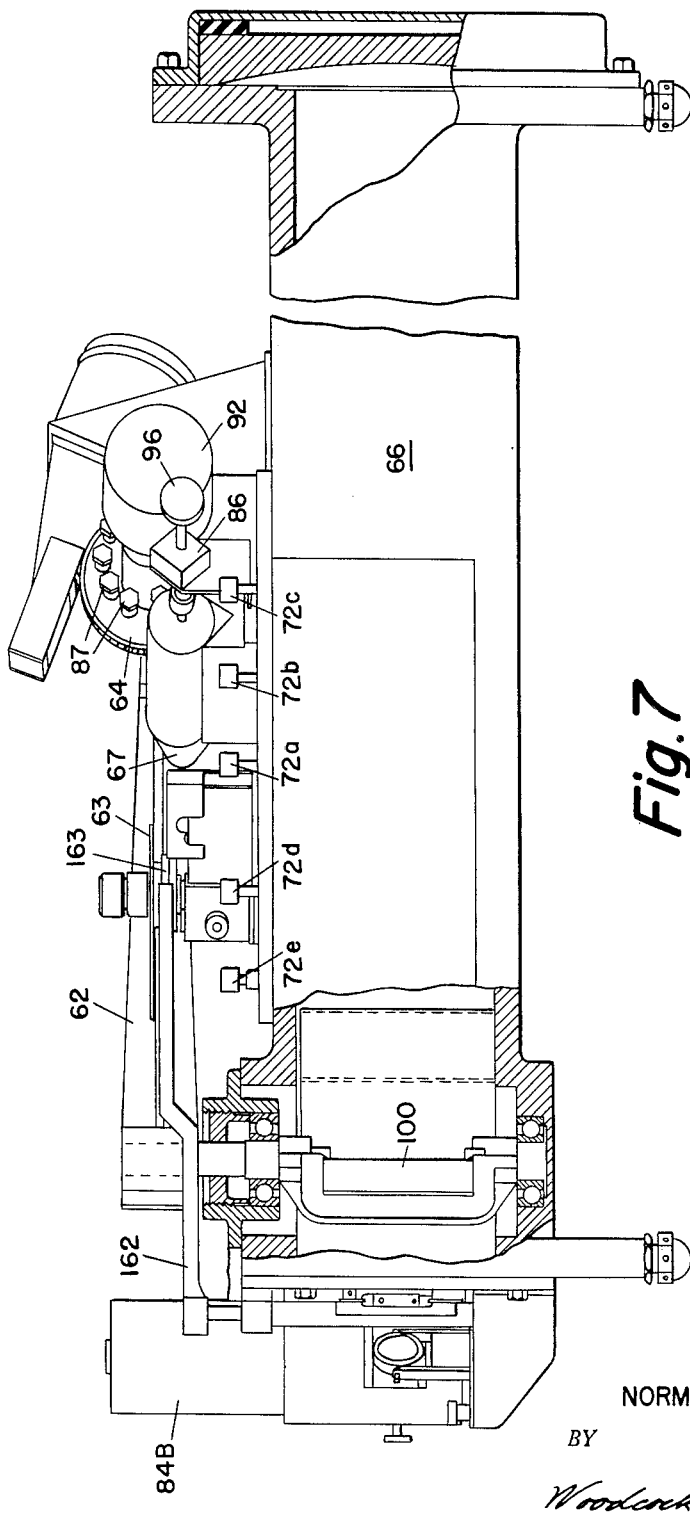

Upon the turret shaft 91 (Figs. 1B, 6) are also mounted the movable contacts of switches 65, 81 and 82 disposed within housing 92 (Figs. 6, 7). These switches, as later described, function in the electromechanical system controlling rotation of the turret 64 to position the stops 87. The turret arrangement is such that when at rest one of the turret stops is always in line with the end of the grating arm 62 for engagement therewith during return movement thereof, and the adjusted position of each individual stop determines the precise angular position to which the grating will return when the cam 63 is in a sufficiently retracted position, i. e., during the dwell portion of the cam 63. The turret stops may be set so that up to twelve different spectral lines may be focused in turn upon the exit slit of the monochromator, one for each angular position of the turret. It is possible to select lines that are substantially adjacent in the spectrum within the limits of resolution of the optical system and the arrangement as above described allows selection of lines in any desired wavelength sequence.

To shift back to continuous scanning, the turret 64 may be removed or its stops 87 backed off sufficiently to avoid engagement by arm 62 for the range of adjustment of scan screw 67 and the cam 63, now decoupled from motor 71, is manually set, if necessary, to clear the path of movement of arm 62 by scan screw 67.

As best shown in Fig. 8, the interlocking push buttons 72a–72d of control panel 192 selectively control the clutches 93a–93d whose driving elements continuously rotate so long as motor 71 is energized. When button 72a is depressed, the clutch 93a is engaged to complete a driving connection between the drive shaft 88 of the continuous scan screw 67 and the shaft 94 of motor 71. The ratio of the gears included in the driving connection is such to afford a suitably high scanning rate, for example 1200 Angstroms per minute. When button 72b is depressed, the clutch 93b is engaged to complete a driving connection between shafts 88 and 94 including gearing whose ratio affords a suitable medium scanning speed, for example 5 Angstroms per minute. When button 72c is depressed, the clutch 93c is engaged to complete a driving connection between shafts 88 and 94 including gear of still lower ratio to afford a suitable low scanning speed, for example 1 Angstrom per minute.

When button 72d is depressed, the motor shaft 94 is coupled to the drive shaft 89 of cams 63 and 163 to rock the grating and slit arms 62, 162, as above described, for each line position of turret 64 to provide a record of only the preselected spectral lines of interest in a particular analysis.

All of buttons 72a–72d are mechanically interlocked by bar 95 so depression of any one of them releases the others and only the last depressed button remains down.

Depression of button 72e insures that all clutches are in neutral or disengaged position. In such case, the scan screw 67 may be operated manually by knob 96: also in such case, the arm 162 may be rocked manually during adjustment of a turret stop 87 for precise centering of a selected line on the exit slit or for slowly scanning one of two closely adjacent lines.

The two manually operated switches 79, 80 (Figs. 1B and 4) may be set by the operator to preselect for analysis during an automatic cycle of the system from one to ten spectral lines corresponding with the settings of turret stops 87. It is also possible, by establishing circuit connections later described, to effect automatic recycling of the system.

For a more complete understanding of the use of the turret and its operation, let it be assumed that the turret stop pins 1 to 12 have been set so that each will stop the grating at a spectral line of interest, and let it further be assumed that an operator desires to run a particular analysis involving the spectral lines respectively corresponding with three stop pins 7, 8, 9 of the turret.

With the power switch 2 of Fig. 1A closed and the equipment otherwise deenergized, the operator sets the switch 90 in the turret-drive position shown in Fig. 1B and turns dial switch 79 until its point #6 is opposite the index. Doing this energizes stepping relay 70 through the circuit traced from the capacitor 69 (charged to the peak line voltage through rectifier 68 from line 101) through the notching relay 70, closed switch 73, closed switch 76, contact 55 of switch 90, the bridging contact disc 97 of rotary switch 79, and contact #1 of switch 81 to ground. This circuit which provides for energization of stepping relay 70 to produce incremental rotation thereof is broken upon opening of switch 76 by a lost motion device 85. A spring 133 effects return of the stepping motor to its original position.

During such increment of movement of the turret, the rotatable contacts of switches 65, 81 and 82 on shaft 91 of the stepping motor 70 are ratcheted 30° to the next point of each of these switches and the turret drum 64 is turned 30° to bring the next stop 87 into alignment with the grating arm 62. Upon reclosure of switch 76 by the spring 133 and lost-motion cam 85, the stepping relay 70 is again energized, the circuit path being the same as before except that it now includes a connection from the bridging contact disc 97 of switch 79 to contact #2 of switch 81. The stepping relay 70 thus being energized will again operate to step the switches 65, 81, 82 and drum 64 through another increment of 30° so that the rotatable contacts of switches 65, 81, 82 and turret 64 move to their #3 positions. This stepping action of relay 70 continues until these switches and the turret reach their #6 position corresponding with the setting of the "First Line" switch 79. It will be noted that the open section of the bridging contact 97 of switch 79 is adjacent contact #6 of switch 79 so that reclosure of switch 76 does not reestablish the circuit for stepping relay 70 through fixed contact #6 of switch 81.

As a result of the action just described, the turret 64 is adjusted to the desired first-line position before an analysis is run.

The "Last-Line" dial switch 80 may now, or could previously have been moved to its #10 position and the system is now ready automatically to measure and record the intensity of lines whose wavelengths correspond with the settings of stop pins 87 numbered #7, 8 and 9.

Pressing start button 32 (Fig. 1A) with the Arc-Spark switch in either position will produce operation of the spectrograph light source as already described above: the resulting energization of relay 30 through closure of its contacts 27 and 28 effects energization of stepping relay 70, Fig. 1B. The circuit which energizes stepping relay 70 may be traced from the capacitor 69 (charged from line 101 through rectifier 68), relay 70, to closed switch 73. From switch 73 there are two parallel paths for the flow of current from stepping relay 70: one path is that through the switch 76 and then through contacts 55 of switch 90 and contacts 28, Fig. 1A, of relay 30 to ground: the other path is through current-limiting resistor 83, Fig. 1B, contacts 54 of switch 90 and contacts 27, Fig. 1A, of relay 30 to ground.

Switch 73, Fig. 1B, is a cyclically operated switch driven from shaft 94 of the motor 71 whose circuit, after depression of the "Start" button 32, Fig. 1A, is completed either through contacts 20 of the "Arc" relay 23 or contacts 21 of the "Spark" relay 25, depending upon the position of the "Arc-Spark" switch AS. Switch 73 prevents operation of the stepping relay 70 at all times excepting when the grating arm 62 is in its extreme position away from all of the turret stop pins. The stepping relay 70 is very fast acting compared to the speed of operation of switch 73: moreover, the reduction of current effected by limiting resistor 83 is sufficient to prevent return of stepping relay 70 to its initial position even though switch 76 opens and continues to preclude such return until switch 73 has opened and the stepping relay 70 deenergized thereby. If therefore for any reason the motor 71 is not rotating, the stepping relay 70 is limited to a single 30° stepping operation.

It is further to be noted that with the motor 71 rotating, the contact of switch 73 will be opened for most of the time during a complete revolution of cam 63 and subsequent operation of the steping relay 70 is impossible until the contacts 73 reclose at the end of a complete revolution of their operating cam 73a.

This arrangement of switch and holding circuits thus insures a single step of operation of the turret between successive line measuring periods of the analysis cycle and prevents operation of the stepping relay at times when the grating arm 62 is not in its fully retracted position.

When relay 30 closes its contacts 26, 27, 28, relay 70 steps the contacts of switches 65, 81, 82 and turret drum 64 through an arc of 30° to point #7 of all of these elements for measurement of the intensity of the first of the seleceted spectral lines. Positioning the movable contact element of switch 65 establishes attenuator connections within power pack 60 to apply to the dynodes of photomultiplier tube 84A voltages which are correct for the normal range of intensity of the spectral line #7: stop #7 of the turret is brought into the path of grating arm 62 to stop it in position to focus spectral line #7 on the exit slit.

While the grating is in the #7 position, the entrance slit arm 162 is slowly moved by cam 163 as previously described for slowly scanning the narrow region including line #7. The arm 162 is quickly restored by cam 163 to its original position while cam 63 is moving the grating arm 62 away from turret 64 just prior to setting of the turret to the next or #8 position.

Upon completion of the measurement on line #7, switch 73 under control of cam 73a driven by motor 71 recloses and the relay 70 steps the turret 64 and the associated switches 65, 81, 82 to proper position for measurement of line #8. Attenuator or sensitivity switch 65 is reset to apply the proper dynode voltages to the photomultiplier tube 84A and continued rotation of the motor 71 repeats its above described operations which include reclosure of switch 73 which permits the next stepping motor operation to rotate the turret 64 to line #9 position.

It will be recalled that lines #7, 8 and 9 were to be measured and that the line switches 79 and 80 were respectively indexed on points 6 and 10. When, after completion of measurement of line #9 the stepping relay 70 adjusts the turret 64 to line #10 and sets the associated switches 65, 81 and 82 to their line #10 positions, the energizing circuit for relay 30 is open between contact #10 of the "Last Line" switch 80 and the shorting contact 98 of that switch. Thus when relay 30 opens, the power to the gaps 49, 50 of the power source is cut off and the recording ends.

At the time of deenergization of relay 30, the movable contact element of dial switch 81 will also be on its point #10 and the motor 71 will stop with switch 73 in the closed position for reasons later discussed. The stepping relay 70 will thereupon be repeatedly energized under the control of switch 76 to step the turret mechanism 64 around until the contact element of switch 81 makes contact with its point #6. Since dial switch 79 in series with switch 81 was indexed to its point #6, the gap in its bridging contact 97 will be at point #6 and the circuit to the stepping relay 70 is broken upon restoration of turret 64 to the present starting position in readiness for an analysis of the #7, 8, 9, lines of the next specimen.

For the next run on these lines, the operator need only open the door 116, Fig. 4, replace the electrodes of the analytical gap 50, reclose the door and depress the starting button 32, Fig. 1A, whereupon the analysis cycle repeats as above described.

At the end of cycle, the motor 71 stops, as above stated, with switch 73 in closed position. Stopping of the motor with switch 73 in such position is provided by switch 77, Fig. 1B, under control of cam 77a driven by motor 71. Switch 77 insures stopping of motor 71 in either of two positions upon deenergization of relay 30. The motor 71 may be stopped either with the grating arm 62 in its extreme position away from the turret stop pins 87, which is the position in which the motor will stop under normal automatic operating conditions, or, if the operator chooses, it will stop with the arm 62 on a pin 87 and with the scanning entrance slit in its central position which is the position for continuous scanning.

This latter feature is provided to enable an operator to check whether the setting of each stop pin 87 centers the corresponding selected spectral line with respect to the exit slit.

The motor 71 may also be operated at will by manual movement of the contacts 52, 53 of switch 102 from their central "Off" position to their uppermost "On" position. When the equipment is being used for automatic analysis, the movable contacts of switch 102 are set to their lowermost "On" position of Fig. 1B. In such position, the circuit to the motor 71 may be traced from line 101, Fig. 1A, through contacts 20 of relay 23 for arc analysis, or contacts 21 of relay 25 for spark analysis, then by way of contact 52 of switch 102, Fig. 1B, through motor 71 to ground. If any of these contacts are opened while the motor 71 is operating with cam 77a in any position for which switch 77 is closed, the motor 71 will remain energized until switch 77 opens, thus insuring the motor 71 does not stop except in one of its aforesaid two desired positions.

It is to be noted that every time a switch which controls energy to the motor 71 is opened, a D.-C. voltage which is built up on capacitor 58 through rectifier 56 during normal operation is applied through resistor 57 to motor 71 quickly to stop it.

With switch 99 in the position shown in Fig. 1B, the chart drive of recorder 75 starts and stops with energization and deenergization respectively of relay 30 under control of its contact 26 so that the chart is moved or fed only during actual analysis of a specimen. With the switch 99 in its intermediate position, the light source or monochromator 66 may be operated for checking or test purposes without movement of the recorder chart. With switch 99 in its uppermost position (Fig. 1B), the chart may be run for testing or checking operation of the recorder 75, amplifier 74, power pack 60 or the phototubes without need for operation of the light source or the monochromator. Movement of the recorder stylus toward or from engagement with the chart may be controlled by a solenoid energized concurrently with the drive motor.

Figure 9:
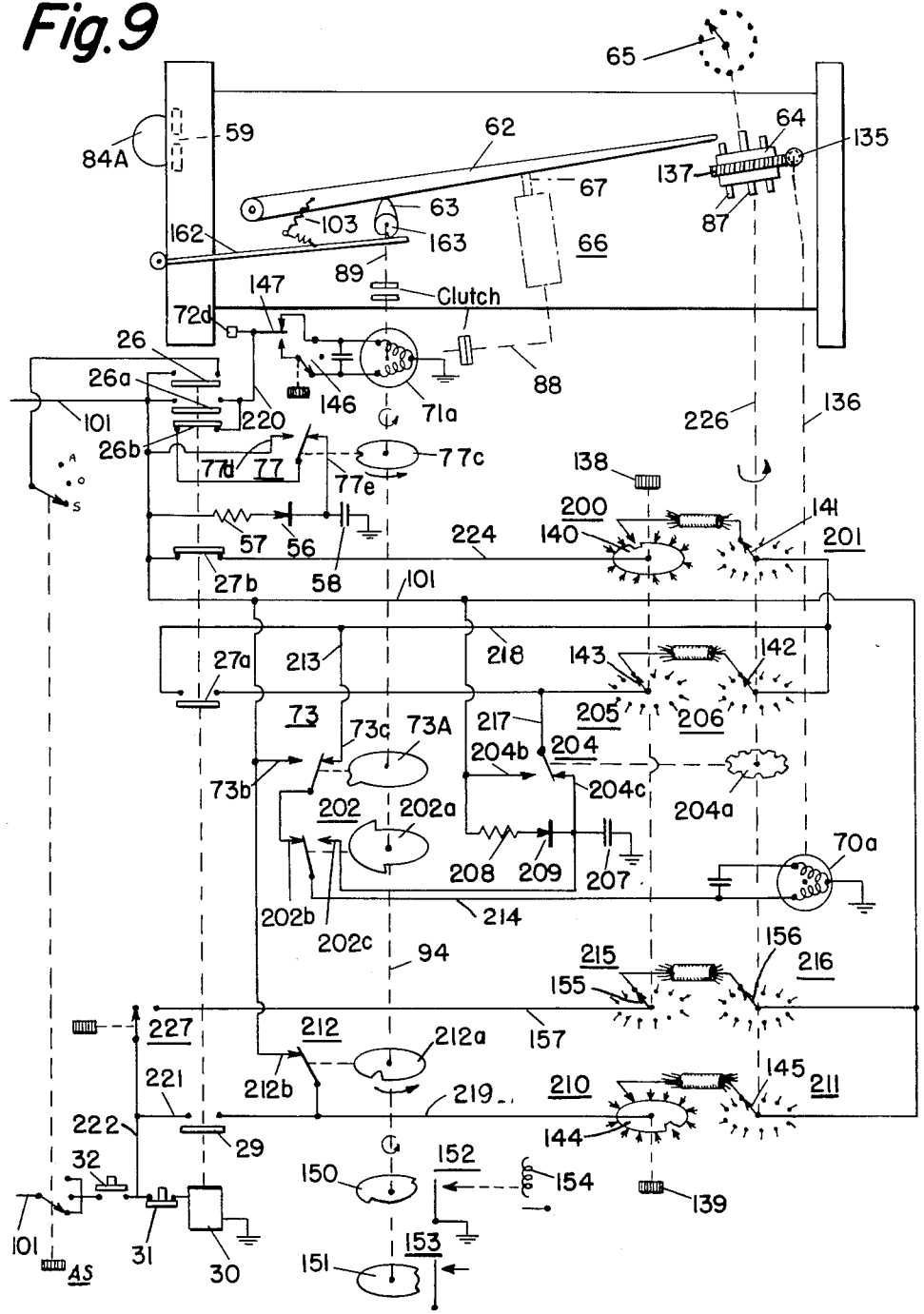
Fig. 9 is an alternate arrangement for positioning the turret of Fig. 1B.

An alternate arrangement for positioning the turret 64 is shown in Fig. 9. In this modification, the driving motor for the turret 64 is a small motor 70a of the revolving armature type instead of the ratcheting type of Fig. 1B. A worm 135 on the motor shaft 136 engages a worm wheel 137 on shaft 226 to position the turret 64 and associated switches 201, 206, 211 and 216 through a high-reduction (such as 100 to 1) drive which relieves the motor of all load inertia except that of the worm and locks the turret in position within small backlash limits of the worm and worm-wheel. The cam 204a on shaft 226 operates microswitch 204 between two circuit positions for each step of movement of shaft 226.

To select a group of spectral lines to be analyzed, the switch knobs 138, 139 are manually set to positions corresponding with the line numbers in the stop sequence of turret 64. The "First Line" knob 138 adjusts the non-shorting type wafer 140 of switch 200 so that a closed circuit condition exists between the wafer and all of the switch contacts except the one corresponding to the adjusted position of the switch 200. When the turret 64 is in any position other than the desired "First Line" position, a closed circuit exists from line 101 through normally closed contacts 27b of relay 30, conductor 224, wafer 140 of "First Line" switch 200, the movable contact 141 of mating switch 201, conductor 218, conductor 213, contact 73c of switch 73, contact 202b of switch 202, conductor 214 and stepping motor 70a to ground. Motor 70a continues to be energized through the above circuit to rotate shaft 226 until the contact 141 of shorting-type rotary switch 201 is in the position which connects with the open-circuited contact of "First Line" switch 200 and the movable contact 142 of shorting-type rotary switch 206 is positioned to agree with the position of non-shorting type contact 143 of switch 205 also set by knob 138.

For such contact positions, the step motor 70a is energized from line 101 through contact 204b of microswitch 204, contacts of switches 205, 206, 73c, 202b through the motor to ground until cam 204a on shaft 226 is in its next "line" position, whereupon contact 204b opens and contact 204c closes, applying a D. C. voltage from capacitor 207 which was charged from the line 101 through resistor 208 and rectifier 209. This pulse of D. C. charge flowing momentarily through the motor 70a dynamically brakes the motor within a half of a rotation of the motor to ±1/10 of a rotation corresponding with 1/1000 revolution of the turret. This slight delay in stopping the turret 64 allows the microswitch contact 204b to be disengaged from cam 204a, thereby removing any radial force on the turret which otherwise might introduce an error in the position of the grating due to motion of the turret.

As an example of the operation of the equipment, let it be assumed that the "First Line" switch has been positioned on line #7 and the last line switch has been positioned on line #9. In accordance with the previously described operation and as a result of positioning first line switch 138 on line #7, the stepping motor 70a operates until the turret 64 has been positioned so that the turret stop pin corresponding to line #7 is in the path of the grating positioning arm 62 and the contacts of the various switches driven with the turret are all in their #7 position. The equipment is now ready for an automatic analysis of lines #7, 8 and 9.

Depressing the start button 32 energizes the coil of relay 30 through a circuit which may be traced from the line 101, through start button 32, closed stop button 31 and thence through the winding of relay 30 to ground. As previously described in connection with Fig. 1A, energization of relay 30 resulted in energization of either an arc or spark relay and the same may be true in the control system for Fig. 9. It is sufficient for the present purposes to omit discussion of these elements.

Energization of relay 30 in Fig. 9 closes the normally open holding-contacts 29, thereby to close a circuit for energizing relay 30 from line 101, through contact #7 of switch 211 on shaft 226, the corresponding contact and shorting wafer 144 of "Last Line" switch 210, conductor 219, contacts 29 of relay 30, stop button 31, through relay 30 to ground. Energization of relay 30 also opens contacts 26b, whose function will later be described, and closes contacts 26a. These latter contacts serve generally the same purpose as contacts 20 of arc relay 23 or contacts 21 of spark relay 25 in Fig. 1A, i. e., energization of the motor 71 of the monochromator. Specifically, closure of contacts 26a of relay 30 establishes a circuit from line 101, through contacts 26a, conductor 220 and motor 71a to ground.

In this preferred arrangement, it is to be noted that when the motor 71a is first energized the equipment is ready for measurement of the selected "First Line," line #7 in this particular example: that is to say, the proper dynode voltage is connected to the photomultiplier tube 84A through attenuator switch 65 and the movable contacts of all of the other associated switches 201, 206, 216 and 211 are in their line #7 position. Because of the inclusion of homing means, which will later be described, rotation of the drive motor 71a always starts from the same position shown in Fig. 9.

During a single revolution of drive shaft 94, cam 63 turns permitting the grating arm 62 to move under the bias of spring 103 against turret stop #7, thereby positioning the grating so that line #7 is focused on the exit slit of the monochromator. Continued rotation of the shaft 94 causes cam 163 to produce a scanning movement of the entrance slit for measurement of line #7. After completion of this slit-scanning operation, the short high point of cam 73A momentarily connects step motor 70a to line 101 through contact 73b of switch 73. This circuit may be traced from power conductor 101, through contact 73b of switch 73, contact 202b of switch 202, through step motor 70a to ground. Very slight rotation of motor 70a causes cam 204a to move and thereby move the movable contact of switch 204 from contact 204c to contact 204b. This closes a circuit from power conductor 101 through contact 204b, conductor 217, closed contacts 27a of relay 30, conductor 218, conductor 213, so that when contactor of switch 73 returns to contact 73c power will continue to flow through contact 202b of switch 202 to maintain the stepping motor 70a energized for continuance of its stepping movement.

The stepping motor 70a drives shaft 136 in the direction to turn the turret 64 and the shaft 226 in the direction indicated by the arrow and the contactors of the associated switches to their line #8 positions. As the high point of cam 204a moves out of engagement with the actuator for switch 204, the contactor thereof moves from contact 204b to contact 204c, thereby disconnecting power from the stepping motor and applying a D.-C. braking voltage thereto. The D.-C. braking voltage is derived from capacitor 207 which is charged from A.-C. line 101 through resistor 208 and rectifier 209. The stepping motor 70a is thus prevented from further rotation during measurement on line #8.

After the stepping motor 70a has positioned the various components for measurement of line #8, continued rotation of the motor 71a causes the cams 63 and 163 to effect positioning of the grating and scanning of the entrance slit as previously described. Upon completion of the measurement of line #8, the high point of cam 73A will again initiate a stepping movement of motor 70a to advance the turret 64 and the switches associated therewith to their line #9 positions, whereupon the last selected line, line #9, is measured.

Movement of switch 211 into its line #9 position interrupts a branch of the hold-in relay circuit which had been maintained through the wafer 144 of switch 210 and the motor-driven contactor 145 of switch 211. Another branch of the hold-in circuit for relay 30 is normally maintained from power conductor 101, through contact 212b of switch 212, conductor 219, hold-in contacts 29 of relay 30, conductor 221, conductor 222, stop button 31 and the coil of relay 30 to ground. Once during each revolution of the shaft 94 of motor 71a (upon completion of the scanning period of a line), cam 212a permits opening of switch 212, thereby momentarily disconnecting this branch of the holding circuit for relay 30. This occurs following the stepping action which adjusts switch 211 into agreement with "Last Line" switch 210, whereupon both branches of the hold-in circuit for relay 30 are open and relay 30 drops out.

Provision is made for continuing the operation of the scanning motor 71a to return the shaft 94 and cams 73A, 202a, 212a thereon to home or starting position: power is maintained to the scan motor 71a from line 101, through a pair of contacts 26b which are closed when relay 30 is deenergized and a contact 77d of a cam-driven switch 77 which for intermediate points in each operating cycle of the shaft 94 is engaged by the movable contact of switch 77 under control of the high point of cam 77c. At the end of the cycle for the last of the selected lines, the engagement of the movable contact of switch 77 with fixed contact 77e effects application to motor 71a of a D.-C. braking voltage from the capacitor 58 through a circuit including contact 77e of switch 77 and closed contacts 26b of deenergized relay 30. The scan motor is thus stopped quickly with cam 63 holding grating arm 62 in its fully retracted position. The D.-C. braking charge of capacitor 58 is supplied to it through rectifier 56 and limiting resistor 57.

Deenergization of relay 30 also re-closes contacts 27b of relay 30 so that conductor 218 is continuously energized as long as switch 201 is in a line position other than the position corresponding with the "First-Line" setting of switch 200, line #7 in the example under discussion. The stepping motor 70a is therefore continuously energized to step the turret 64 and the associated switches through the positions for lines #10, 11, 12 and 1 to 6 inclusive, thus to restore the equipment in readiness for another measurement of lines #7 to #9 as described above.

In event of a temporary power failure, the switch 202, operated by cam 202a on shaft 94, prevents immediate re-cycling of the turret 64 and possible damage. Should the power fail during measurement of a line, the relay 30 will drop out and will not be re-energized until the start button is again depressed. When power is restored, the scan motor 71a will automatically "home" since power will be supplied thereto through contacts 26b until, as above described, the switch 77 is operated by cam 77c to disconnect the power and apply the D.-C. braking voltage. As above pointed out, when the motor 71a is braked, cam 63 stops and holds the grating arm 62 in its fully retracted position. During the portion of the cycle of rotation of shaft 94 for which arm 62 is in a substantially fully retracted position, the high portion of cam 202a holds the contactor of switch 202 in engagement with contact 202b so that either power or braking potentials can be applied to stepping motor 70a through switch 73. During any other portion of the cycle for which the grating arm is not in it retracted position, the low portion of cam 202a permits a closure of switch 202 on contact 202c so that a D.-C. braking potential is maintained on stepping motor 70a to prevent rotation thereof until the grating arm 62 has been moved out of the path of the turret stops. After the grating arm has been moved out of the way, the stepping motor 70a will return the turret 64 and associated switches to the "First Line" position corresponding with the setting of switch knob 138.

Other cams such as pen-lift cam 150 and a pen-motor cam 151 may be provided on shaft 94 to operate in timed relation with the operation of the monochromator so as to prevent recording of spurious signals, and undesirable excursions of the pen. Switch 153 actuated by cam 151 deenergizes the recorder-balance motor when the grating arm is being positioned by a turret stop or the continuous scan screw 67 and switch 152 actuated by cam 150 controls a solenoid holding the recorder pen from chart until the balancing motor has brought the system substantially into balance.

To adapt the instrument for continuous repeated recording of a sequence of line intensity measurements or ratio measurements of these lines with respect to a standard, the switch 227 and the additional pair of switches 215 and 216 are included. In order to effect automatic recycling, switch 227 is manually set to the recycle position so that when the motor 70a adjusts the turret 64 to the "First-Line" position subsequent to completion of a measurement of the "Last Line," relay 30 is reenergized to begin the next cycle.

As shown in Fig. 9, the movable contact 155 of switch 215 is set concurrently with movable contacts 140, 143 of switches 200, 205 by manual adjustment of knob 138 to the desired first line of the series to be analyzed. The movable contact 156 of its mating switch 216 is driven from shaft 226 of stepping motor 70a in synchronism with the monochromator turret 64. Thus, for the "First Line" position of the turret, the hold-in for relay 30 is maintained through "Stop" switch 31, conductor 222, recycling switch 227, conductor 157, the #1 and movable contact 155 of switch 215, the #1 and movable contact 156 of switch 216 to power conductor 101.

To restore the equipment for single cycle scanning, the switch 227 is returned to the open-circuit position shown in Fig. 9.

For continuous scanning, button 72d (Figs. 8, 9) is depressed to decouple motor 71a from the shaft 89 of the grating cam 63 and one of buttons 72a–72c is depressed for operation of the continuous drive screw 67 for grating arm 62 at the desired speed of scanning. The reversing switch 147 for motor 71a permits the scanning to be from higher to lower wavelengths or vice versa. The switch 146 in circuit with reversing switch 147 and operable by push button 72d shifts the connection so that motor 71a is reversible for continuous scanning and non-reversible for selected group scanning.

The two motors of Figs. 1B and 9 and their electro-mechanical control system may be used in a monochromator disclosed in copending application Serial No. 241,188 to effect rocking movement of the entrance slit arm, to effect step-by-step movement of a turret having stops sequentially moved into the path of that arm to center its movement with respect to each of the selected lines and to effect step-by-step movement of a line selector shutter for the exit slit.

It shall be understood the invention is not limited to the exemplary embodiments specifically shown and described, but comprehends other modifications within the scope of the appended claims. There are other novel features disclosed herein which are claimed in my copending application Serial No. 536,885, filed September 27, 1955, which is a division of this application.

What is claimed is:

1. In a spectrograph system, a monochromator having a light dispersing element associated with an arm movable to vary the wavelength of the output radiation, a cam for engaging said arm, a turret having adjustable stops spaced for sequential positioning in the path of said arm for successive angular positions of the turret and preset respectively to correspond with the wavelengths of different spectral lines of the dispersed radiation, a first motor for driving said cam for controlling rocking movement of said arm away from and back toward engagement with a turret stop, a second motor for actuating said turret sequentially to position said stops for engagement by said arm, and means for precluding actuation of said turret when said arm is in the path of said stops comprising switching means in circuit with said second motor and actuated by said first motor to energize said second motor when said cam driven by said first motor is in engagement with said arm and holding it clear of said path.

2. An arrangement as in claim 1 in which the cam motor has two energizing circuits, one of which includes a first switching means operable to closed position to initiate operation of that motor and to open position to break said one of the energizing circuits, and the other of the energizing circuits including a second switching means controlled by the cam motor to maintain energization thereof through said other circuit after said first switching means has broken said one energizing circuit and until said arm is moved to predetermined position by said cam.

3. An arrangement as in claim 1 additionally including for analysis of a selected group of spectral lines a multi-point switch manually set to predetermine the last-line position of the turret for an analysis cycle, a multi-point switch stepped by the turret motor in correspondence with the turret-stop positions and in circuit with the manually set last-line switch, and a relay having contact structure moved upon energization of the relay to effect energization of the cam motor for an analysis cycle and which is deenergized upon correspondence between the positions of said manually set and motor-actuated multi-point switches.

4. An arrangement as in claim 1 additionally including a multi-point switch manually set to predetermine the first-line setting of the turret for an analysis cycle, a multi-point switch stepped by the turret motor in correspondence with the stop positions and in circuit with the manually set first-line switch, and a relay having a back contact in circuit with said multi-point switches and the turret motor to effect stepping thereof until in first-line position.

5. An arrangement as in claim 1 additionally including a pair of multi-point switches manually preset respectively to predetermine the first-line and last-line positions of the turret for an analysis cycle, a pair of multi-point switches stepped by the turret motor and respectively in circuit with said manually preset switches, and control circuits for said motors including said pairs of multi-point switches to effect deenergization of the cam motor when said cam driven thereby is holding said arm out of the path of the turret stops before stepping of the turret motor from its last scanned line-position and to effect stepping of the turret motor to its first-line position while the cam motor is deenergized.

6. An arrangement as in claim 1 which additionally includes capacitors charged during energization of the motors and connected to apply a braking impulse to the motors as each is deenergized so to insure accurate positioning of said cam and said turret.

7. An arrangement as in claim 1 additionally including a drive screw for engaging said arm, and selector means for decoupling the first motor from said cam and coupling it to said drive screw to effect continuous movement of said arm for a continuous spectrum analysis.

8. An arrangement as in claim 3 in which the relay also has contact structure controlling excitation of the light source for said monochromator and which includes a switch momentarily actuated to energize said relay for energization of the light source and the cam motor.

9. An arrangement as in claim 1 in which a photomultiplier tube receives the output radiation of the monochromator, and in which a multi-point switch stepped by the second motor determines the voltage to said tube for each of the successive angular positions of said arm.

10. An arrangement as in claim 1 additionally including a pen-chart recorder for recording the intensity of the output of the monochromator, and switching means operated by the cam motor to control movement of the pen toward and from engagement with the chart in avoidance of recording during movement of the monochromator arm from engagement with one turret stop to the next.

11. An arrangement as in claim 10 additionally including switching means operated by the cam motor to preclude movement of the recorder pen transversely of the chart during movement of the monochromator arm from one to another of the turret stops.

12. An arrangement as in claim 5 additionally including a switch selectively preset in one circuit-controlling position to effect reenergization of said cam motor for another analysis cycle upon return of the turret to its first-line position and preset in another circuit-controlling position to maintain deenergization of said cam upon return of the turret motor to its first-line position.

13. An arrangement as in claim 1 in which a switch in circuit with the turret motor and cam actuated by the cam motor precludes stepping of the turret except when the arm associated with the light-dispersing element is out of the path of the turret stops.

14. An arrangement as in claim 1 in which the second motor is a low-inertia motor having a worm, worm-wheel drive to the turret and in which accurate positioning of the turret is obtained by discharge of a condenser through the motor upon its deenergization, the worm-wheel drive relieving the deenergized motor of the inertia of the turret.

15. In a spectrometer system for analysis of selected lines of a spectrum including a light source and a monochromator having a light-dispersing element associated with an output wavelength arm, means for positioning said arm at selected spectral line settings including a rotatable turret having stops sequentially engaged by said arm and respectively preset in correspondence with the wavelengths of the selected spectral lines, an operating motor for rotating said turret step-by-step, and a second motor for rocking said arm out of the path of said stops and effecting periodic energization of the turret motor; a pair of multi-point switches manually preset respectively to predetermine the first-line and last-line settings of said turret for an analysis cycle, a pair of multi-point switches stepped by said turret motor and respectively in circuit with said manually preset switches, a relay having contacts in circuit with the light source, the second motor and said pairs of multi-point switches, and a start switch momentarily closed to effect energization of said light source and said second motor to initiate an analysis of spectral lines within the group selected by the manually preset switches, the last-line switches deenergizing said relay to terminate energization of said source and said second motor, and the first-line switches during deenergization of the relay effecting circuit connections which provide for stepping of the turret by said second motor to the first line setting.

16. In a spectrograph system including a radiation-responsive device, a monochromator having a light-dispersing element associated with an arm movable to different angular positions to vary the wavelength of the output radiation received by said radiation-responsive device, a rotatable turret having angularly spaced stops sequentially engageable by said arm and preset to correspond with the wavelengths of different spectral lines produced by dispersion of input radiation by said light-dispersing element, an actuating cam for said arm having an active portion for engaging said arm and movable in one direction for controlling movement of said arm away from and then back toward said turret and having a dwell portion for which said arm is in angular position determined by its engagement with one of said stops, a first motor energizable to actuate said cam through a cycle of unidirectional movement normally beginning and ending with said active portion of said cam in engagement with said arm and during which said arm remains at rest in engagement with one of said stops for the dwell portion of the cam for measurement of the intensity of the corresponding spectral line, a second motor energizable to actuate said turret independently of actuation of said arm sequentially to position said stops in the path of said arm, and switching means actuated by said first motor and in circuit with said second motor timed to effect energization of said second motor while said arm is in engagement with said active portion of said cam and held thereby out of the path of the turret stops.

References Cited in the file of this patent

UNITED STATES PATENTS

| | | |
|---|---|---|
| 1,508,770 | Blood | Sept. 16, 1924 |
| 2,151,756 | Fletcher et al. | Mar. 28, 1939 |
| 2,313,653 | Lyman et al. | Mar. 9, 1943 |
| 2,324,051 | Alles | July 13, 1943 |
| 2,336,550 | Kruper | Dec. 14, 1943 |
| 2,339,053 | Coleman | Jan. 11, 1944 |
| 2,346,512 | Schribner et al. | Apr. 11, 1944 |
| 2,391,225 | Clark | Dec. 18, 1945 |
| 2,411,741 | Michaelson | Nov. 26, 1946 |
| 2,414,363 | Dietert et al. | Jan. 14, 1947 |
| 2,417,489 | Hasler | Mar. 18, 1947 |
| 2,453,164 | Swings | Nov. 9, 1948 |
| 2,456,116 | Enns | Dec. 14, 1948 |
| 2,517,121 | Liston | Aug. 1, 1950 |
| 2,557,589 | Bayerl | June 19, 1951 |
| 2,558,074 | Clayborn et al. | June 26, 1951 |
| 2,577,814 | Saunderson et al. | Dec. 11, 1951 |
| 2,605,671 | Canada | Aug. 5, 1952 |